United States Patent [19]

Boudreau et al.

[11] Patent Number: 5,574,561
[45] Date of Patent: Nov. 12, 1996

[54] KINEMATIC MOUNTING OF OPTICAL AND OPTOELECTRONIC ELEMENTS ON SILICON WAFERBOARD

[75] Inventors: Robert A. Boudreau, Hummelstown; Hongtao Han, Mechanicsburg; Michael Kadar-Kallen, Harrisburg; John R. Rowlette, Sr., Hummelstown, all of Pa.

[73] Assignee: The Whitaker Corporation, Wilmington, Del.

[21] Appl. No.: 362,625

[22] Filed: Dec. 22, 1994

[51] Int. Cl.⁶ ................................................ G01B 11/00
[52] U.S. Cl. .................... 356/399; 356/400; 228/180.21; 361/760
[58] Field of Search .................................. 356/399, 400; 228/180.21; 29/834; 361/400

[56] References Cited

U.S. PATENT DOCUMENTS

| | | | |
|---|---|---|---|
| 4,210,923 | 7/1980 | North et al. | 357/30 |
| 4,288,808 | 9/1981 | Hantusch | 357/68 |
| 4,565,314 | 1/1986 | Scholz | 228/180.2 |
| 5,123,073 | 6/1992 | Pimpinella | 385/59 |
| 5,329,423 | 7/1994 | Scholz | 361/760 |

Primary Examiner—Frank Gonzalez
Assistant Examiner—Robert Kun
Attorney, Agent, or Firm—W. S. Francos

[57] ABSTRACT

The present invention relates to a novel, accurate, passive alignment of optical and optoelectronic elements using silicon waferboard technology. The invention particularly relates to the use of etched v-grooves on monocrystalline materials in conjunction with alignment spheres to effect the passive alignment.

9 Claims, 6 Drawing Sheets

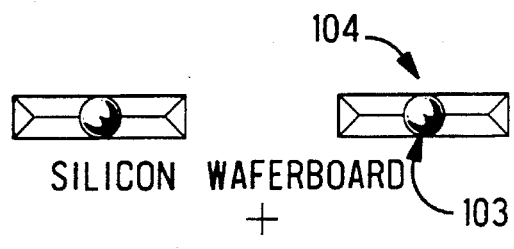
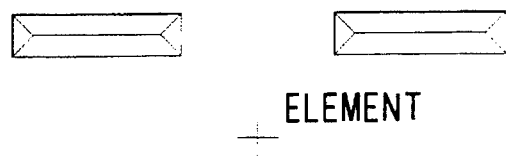
Fig. 1a
Fig. 1b
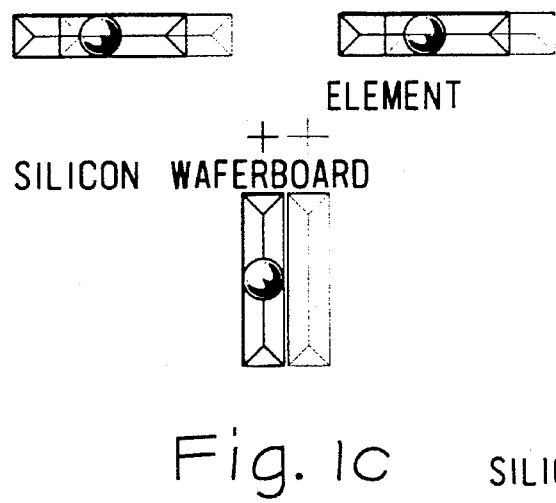
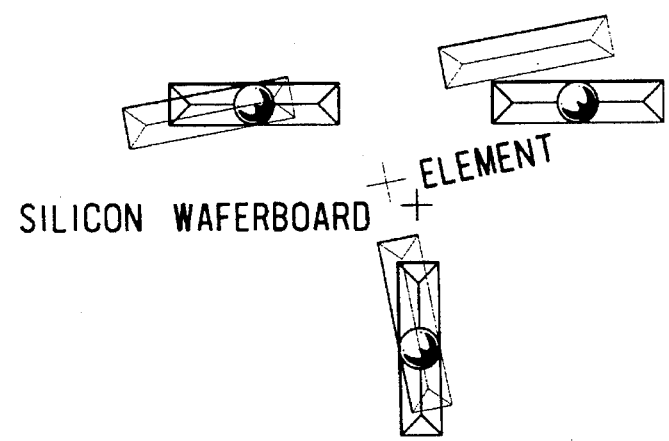
Fig. 1c
Fig. 1d

ELEMENT
+
SILICON WAFERBOARD

ELEMENT
+
SILICON WAFERBOARD

5,574,561

KINEMATIC MOUNTING OF OPTICAL AND OPTOELECTRONIC ELEMENTS ON SILICON WAFERBOARD

FIELD OF THE INVENTION

The present invention relates to a novel, accurate, passive alignment of optical and optoelectronic elements using silicon waferboard technology. The invention particularly relates to the use of etched v-grooves on monocrystalline materials in conjunction with alignment spheres to effect the passive alignment.

BACKGROUND OF THE INVENTION

The advent of optical communications has resulted in the use of various means to effect optical coupling with high efficiency with the hope of reduced cost of integration. One way in which those charged with this task have chosen to effect the desired end is by the use of silicon waferboard technology. To this end, the use of silicon in substantially monocrystalline form allows the skilled artisan to selectively etch the silicon to reveal well defined crystalline planes with precise orientations. The use of silicon waferboard technology has enabled various and sundry desired alignment techniques of devices to passive elements and fiber to fiber alignment, to mention a few. An example of the tools used to effect the selective etching is found in U.S. Pat. No. 4,210,923, to North, et al., the disclosure of which is specifically incorporated herein by reference. North, et al. discloses the selective masking of a silicon substrate having major surfaces lying in the (110) crystalline plane. An etch resistant mask of SiO$_2$ is selectively grown and etching is effected by the use of an anisotropic etchant such as KOH. The '923 patent also discloses how the depth of the etch is directly proportional to the width of the etch in this self-limiting process. This particular orientation of substrate will allow for etching of v-grooves having sidewalls and an endwall in the (111) family of planes. This structure allows for the orientation of devices via, as well as the placement of fibers in, the etched grooves. The use of the well-defined crystalline planes of monocrystalline materials has played a fundamental role in the alignment of optical components in optical interconnects. One field of use deals with mechanical alignment via alignment spheres and spherical lenses. For example, U.S. Pat. No. 5,123,073 to Pimpinella teaches the technique of etching wells for spherical lenses and troughs for cylinders. The reference discloses the use of metal or glass cylinders in v-grooves or troughs for rough positioning of lens-spheres of an upper fiber holder with respect to receiving grooves in a lower fiber holder. The optical fibers are held in etched v-grooves. Misalignment of the upper and lower fiber holders is rectified by tapered surfaces on the upper holder engaging the cylinders on the lower holder. Finally, the reference discloses the use of a tripod structure of spherical supports to retain the opposing groove surfaces of the upper and lower fiber holders in predetermined parallel planes while preventing rotation of the fiber holders.

Blind assembly of elements has been utilized in the mating of chip carriers in the electrical assemblies. For example, U.S. Pat. No. 4,565,314 discloses the use of alignment indents having alignment balls mounted therein. This enables the connection of the electrical traces without visual means. Finally, U.S. Pat. No. 5,329,423 the use of raised bumps to effect interconnection of electrical components with the use of a bump-and-socket arrangement. The disclosures of these patents are specifically incorporated herein by reference.

The major drawback with the inventions heretofore mentioned is that there is little if any tolerance in the various degrees of freedom, making precision of alignment of the alignment components critical. What is needed is an alignment scheme that allows for inaccuracies and tolerances in alignment of the devices.

OBJECTS, FEATURES AND ADVANTAGES OF TEE INVENTION

It is an object of the instant invention to provide for alignment of optical elements on silicon waferboard by having selectively etched grooves for receiving alignment spheres to effect the alignment of elements mounted or placed on the silicon waferboard.

It is a feature of the instant invention to effect the accurate positioning and dimensions of the alignment grooves by accurate etching techniques known in the art.

It is an advantage of the instant invention to achieve highly accurate alignment of optical components without visual reckoning, and with tolerance built into the alignment scheme.

DETAILED DESCRIPTION OF THE PREFERRED EMBODIMENTS

Figure 1E:
FIGS. 1(a–f) are top views of the invention showing how alignment is effected with v-grooves etched in both substrates.
Figure 1E:
Figure 1E:
Figure 1F:
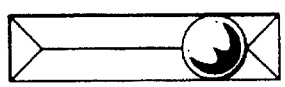
Figure 1F:
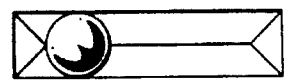
Figure 1F:
Figure 2A:
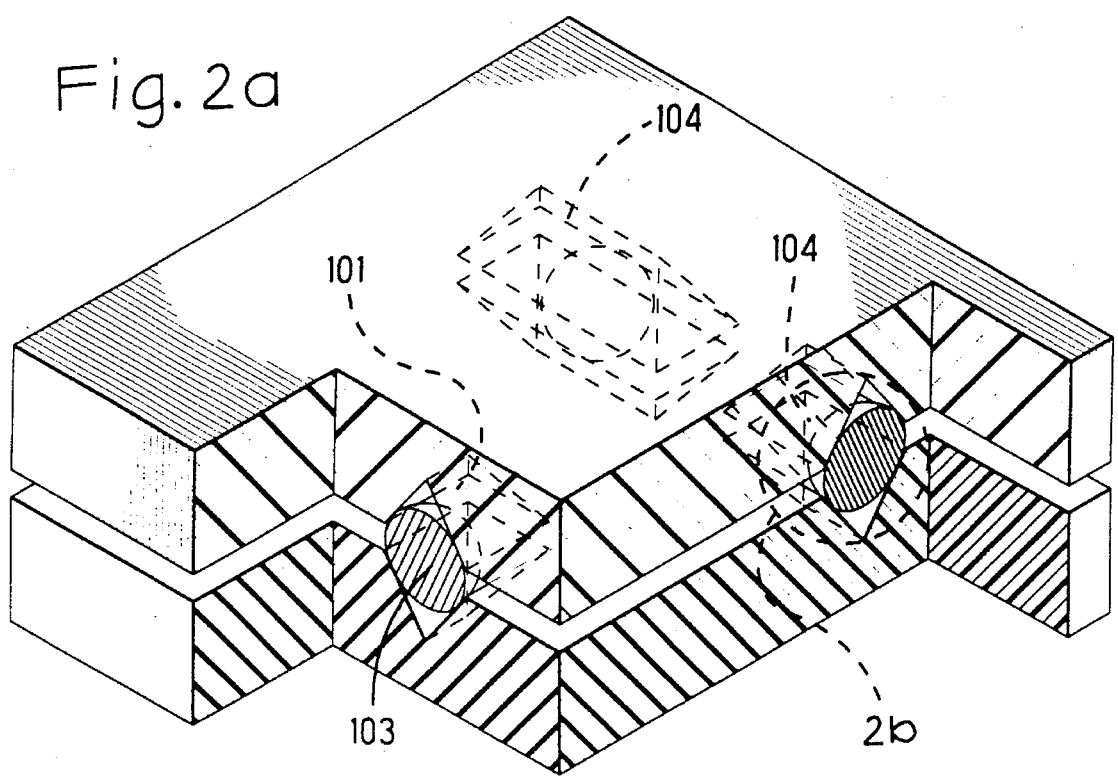
FIG. 2 is a three dimensional view of an exemplary silicon waferboard mounted and aligned with another silicon waferboard by the instant invention.
Figure 2B:
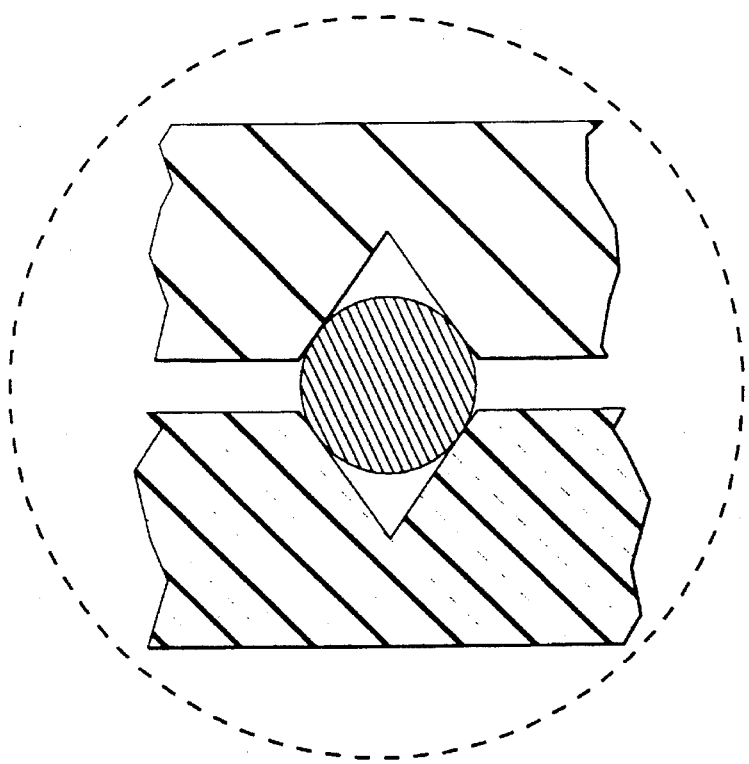
Figure 3A:
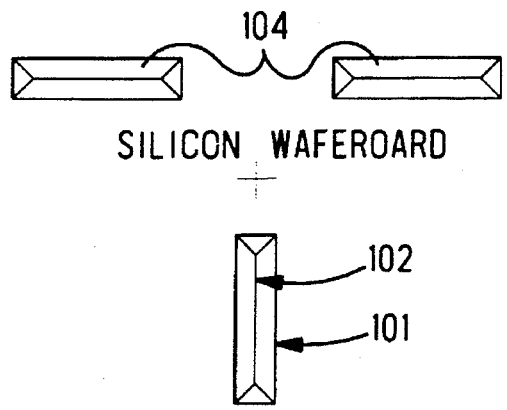
FIGS. 3(a–f) are top views of the instant invention with v-grooves etched into one substrate and the alignment balls fixed to the other substrate.
Figure 3B:
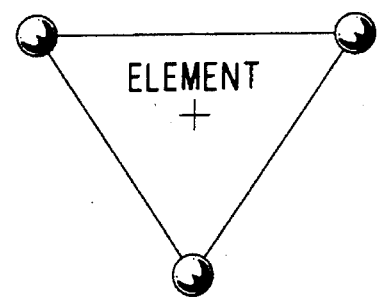
Figure 3C:
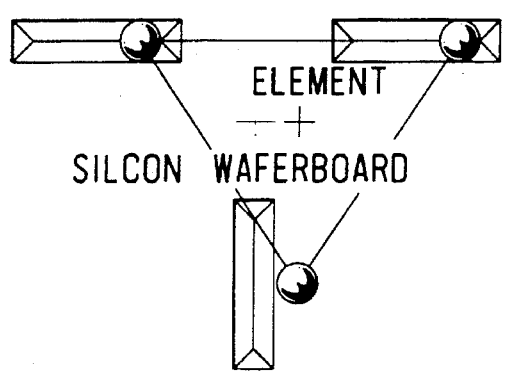
Figure 3D:
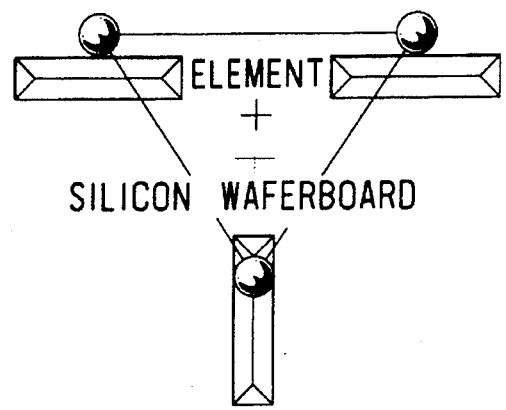
Figure 3E:
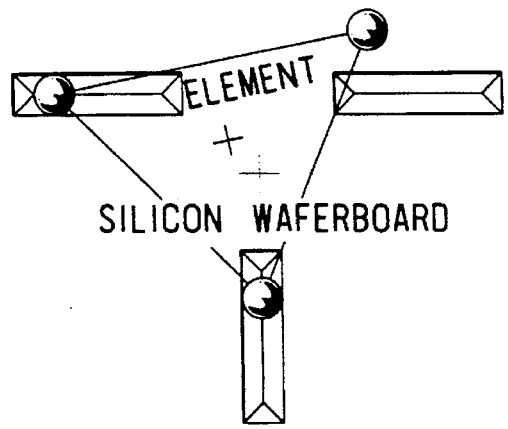
Figure 3F:
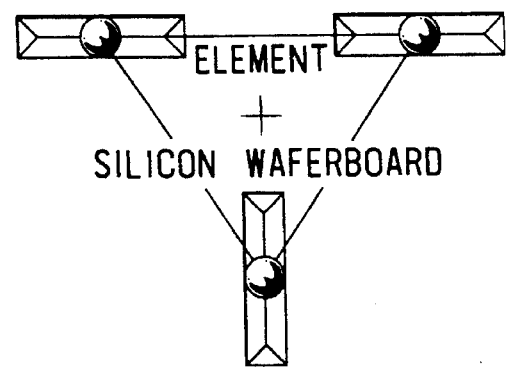
Figure 4A:
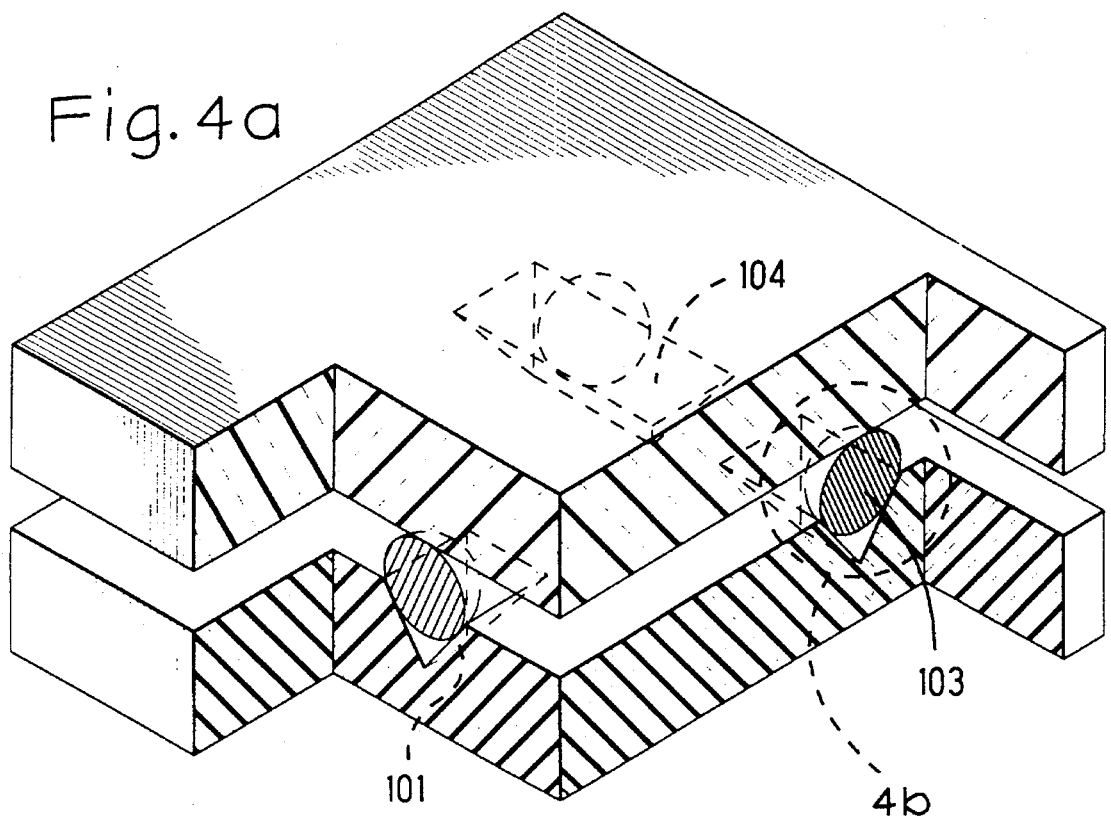
FIG. 4 is a three dimensional view of the instant invention with v-grooves etched into one substrate and the alignment balls fixed to the other substrate.
Figure 4B:
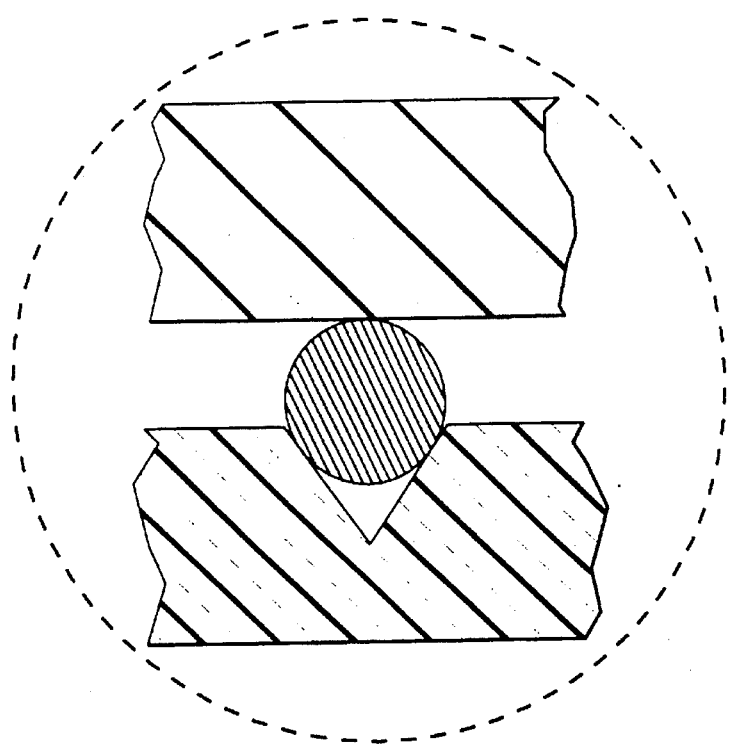
Figure 5:
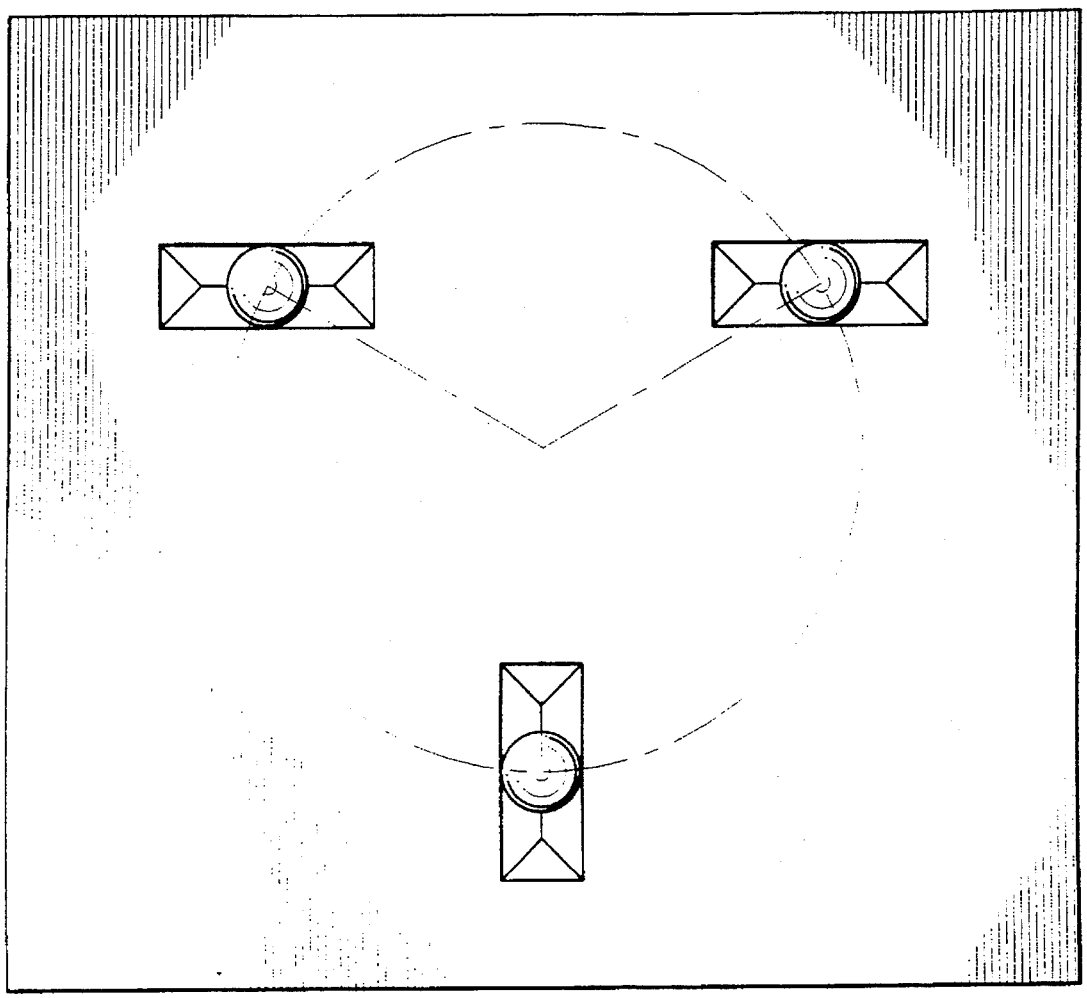
FIG. 5 is a top view of the tripod arrangement of kinematic mounting.

Turning to FIG. 1, we see that the alignment grooves are etched into a monocrystalline substrate. The etching of the v-shaped grooves 101 is effected as follows. For the purposes of illustration, assume that the substrate is of the (110) crystalline orientation of the major surface. A mask that is inert to the etchant use is laid down with a selectively placed window to effect the groove. The mask may be for example SiO$_2$ and the etchant can be a KOH solution. The etching is effected by standard technique, and the sidewalls of the grooves 102 are revealed in the (111) orientation. The width of the groove dictates the depth of the groove, and accordingly by accurately choosing the width of the mask window, the depth of the is known with relatively good precision. Further details of the selective etching of v-grooves in monocrystalline is found in U.S. Pat. No. 4,210,923, the disclosure of which is specifically incorporated herein by reference. Microspheres 103 are then placed in the grooves between an upper and lower wafer board, with the grooves of each waferboard having been etched to be roughly complementarily placed. The placement of the spheres has advantages of the prior art as discussed presently. The instant invention has the advantage of using no more alignment members as there are degrees of freedom. The mounting arrangements of the present invention where the number of free parameters matches the number of constraints is known as kinematic mounting. "Kinematic" (from the Greek "kinema" meaning motion) refers to the fact that an element which is kinematically mounted can be removed and replaced with the second alignment being identical to the first, since the number of constraints imposed by the alignment members matches the number of degrees of freedom of the element. Note that in FIG. 1, the mounting is not kinematic if the balls are moved, since the alignment depends on the position of the balls in the grooves if the groove patterns in the top and bottom plate are not identical. If however the balls remain in place on the bottom v-grooves, or if the balls are fixed to the top substrate as shown in FIG. 3, then the mounting is kinematic. Mounting the substrates as shown in FIG. 1 allows for the positioning of balls to avoid defects which may be present in the grooves. The alignment in FIG. 1 will be very insensitive to the ball position if the v-grooves are nearly identical. Note that in the arrangement in FIG. 1, there are grooves 104 corresponding with one coordinate direction, and a groove 101 corresponding to another, orthonormal direction. The height of each ball from the surface of the lower substrate is fixed by the depth and angle of the v-grooves 101 and 104. Likewise, the height of the top substrate at the position of the three balls is determined by the registration of the balls in the grooves in the top substrate. Establishing the height of the top substrate at three points is necessary and sufficient to determine the plane which contains the bottom surface of the top substrate. Balls in grooves 104 constrain the translation of the top plate in the direction orthogonal to the grooves, and constrain the rotation of the top substrate. Groove 101 constrains the motion of the plate in the orthogonal direction. Thus the position of the top plate is completely determined, yet not overdetermined, leading to stable, kinematic mounting. Although the grooves shown in FIG. 1 consist of two collinear grooves 104 and an orthogonal groove 101, kinematic mounting will result in three grooves per substrate are placed at any position and with any orientation, provided that all three are not parallel. Orthogonal grooves have the advantage that they can be etched in silicon with a (110) crystalline orientation. By virtue of the groove structure, there is tolerance, whereas the limitation of the prior art created alignment that was intolerant to misplaced alignment members. The instant invention has the advantage of enabling sub-micron accuracy of alignment by virtue of the accuracies of etching monocrystalline silicon. Finally, it is important to note that while this discussion has focused on the use of the instant invention on monocrystalline silicon planar substrates, the invention could effect alignment to any rigid three-dimensional object that can be supported at three points. Finally, it is important to note that if the v-grooves are made on silicon waferboard, and the matching v-grooves are made on the underside of the element (on a second waferboard), and if the element is placed on balls which are located in grooves in the waferboard, then the two groove patterns will be aligned as shown in FIG. 2. This arrangement is kinematic once the position of the balls is fixed, and has the advantage that the balls can be placed so as to avoid defects in the v-grooves on either waferboard. The alignment is very insensitive to the position of the balls along each of the three grooves.

FIG. 3 shows the instant invention having the alignment mounted on one substrate in locations that substantially match the locations of the v-grooves of the second substrate. In this embodiment of the invention, there is one and only one position where all three balls 103 are properly registered in the grooves. This type of configuration again shows how the number of constraints matches the number of degrees of freedom. In this embodiment, the balls are mounted on the bottom of an optoelectronic device, and this device is then mounted on a silicon waferboard having the v-grooves etched thereon. The representation shows possible misalignment in 3(c),3(d) and 3(e). Proper registration of the balls in the grooves is readily had in 3(f) from slight adjustment of the system of 3(c),3(d) or 3(e).

The invention having been described, the inventors recognize that there are obvious alternatives in the invention, and accordingly, such are intended to be within the purview of the skilled artisan and within the teachings of the instant invention.

We claim:

1. An alignment apparatus for aligning optical elements with great precision, comprising:

a first substrate having a top surface, a bottom surface and a selected thickness therebetween;

grooves formed on said top surface of said first substrate, said grooves forming a tripod arrangement having tolerance in two degrees of freedom;

a second substrate having a top surface, a bottom surface and a selected thickness therebetween;

grooves formed on said bottom surface of said second substrate, said grooves formed to substantially match the location of the grooves on the first substrate to enable accurate alignment; and ball elements mounted in said grooves of said substrates thereby enabling alignment between said grooves and thereby said substrates and the optical elements thereon.

2. An alignment apparatus as recited in claim 1, wherein said first and second substrates are monocrystalline silicon, and said grooves are selectively etched having sidewalls in preferred crystalline planes.

3. An alignment apparatus as recited in claim 1, wherein said ball elements are precision microspheres of glass.

4. An alignment apparatus as recited in claim 1, wherein said ball elements are precision microspheres of metal.

5. An alignment apparatus as recited in claim 2, wherein said top surface of said first substrate and said bottom surface of said second substrate are in the (110) crystalline plane and said sidewalls are in the (111) family of crystalline planes.

6. An alignment apparatus for aligning optical elements with great precision, comprising:

a substrate having a top surface, a bottom surface and a selected thickness therebetween;

grooves formed on said top surface of said substrate, said grooves forming a tripod arrangement having tolerance in two degrees of freedom;

a second substrate having a top surface, a bottom surface and a selected thickness therebetween; and alignment balls mounted on said second substrate located so as to substantially match the location of the grooves on the first substrate to enable accurate alignment thereby enabling alignment between said grooves and said alignment balls and thereby said substrates and the optical elements thereon.

7. An alignment apparatus as recited in claim 6, wherein said first substrate is monocrystalline silicon, and said grooves are selectively etched having sidewalls in preferred crystalline planes.

8. An alignment apparatus as recited in claim 6, wherein said ball elements are precision microspheres of glass.

9. An alignment apparatus as recited in claim 6, wherein said ball elements are precision microspheres of metal.

* * * * *